United States Patent
Olhofer et al.

(10) Patent No.: US 10,853,528 B2
(45) Date of Patent: Dec. 1, 2020

(54) OPTIMIZING THE DESIGN OF PHYSICAL STRUCTURES/OBJECTS

(71) Applicant: HONDA RESEARCH INSTITUTE EUROPE GMBH, Offenbach/Main (DE)

(72) Inventors: Markus Olhofer, Offenbach (DE); Nikola Aulig, Offenbach (DE)

(73) Assignee: HONDA RESEARCH INSTITUTE EUROPE GMBH, Offenbach/Main (DE)

( * ) Notice: Subject to any disclaimer, the term of this patent is extended or adjusted under 35 U.S.C. 154(b) by 1241 days.

(21) Appl. No.: 14/162,159

(22) Filed: Jan. 23, 2014

(65) Prior Publication Data

US 2014/0214370 A1 Jul. 31, 2014

(30) Foreign Application Priority Data

Jan. 30, 2013 (EP) .................................... 13153179

(51) Int. Cl.
*G06F 30/00* (2020.01)
*G06F 30/23* (2020.01)
*G06F 30/15* (2020.01)
*G06F 111/06* (2020.01)
*G06F 111/08* (2020.01)

(52) U.S. Cl.
CPC .............. *G06F 30/00* (2020.01); *G06F 30/15* (2020.01); *G06F 30/23* (2020.01); *G06F 2111/06* (2020.01); *G06F 2111/08* (2020.01)

(58) Field of Classification Search
CPC ............. G06F 17/5018; G06F 17/5086; G06F 2217/08
See application file for complete search history.

(56) References Cited

U.S. PATENT DOCUMENTS

| | | | | |
|---|---|---|---|---|
| 5,815,394 A | * | 9/1998 | Adeli .................. | G06F 17/5004 700/103 |
| 8,098,244 B2 | * | 1/2012 | Olhofer .................. | G06T 17/30 345/419 |
| 2004/0020968 A1 | * | 2/2004 | Howell ................. | B81C 99/006 228/103 |
| 2004/0199365 A1 | * | 10/2004 | Washizawa ............. | G06F 17/50 703/1 |

(Continued)

OTHER PUBLICATIONS

Authors Unknown, Particle swarm optimization, Wikipedia—the free encyclopedia, as archived on Jan. 24, 2013, 9 pages; obtained on Sep. 18, 2016 from https://en.wikipedia.org/w/index.php?title=Particle_swarm_optimization&oldid=534711952.*

(Continued)

*Primary Examiner* — Omar F Fernandez Rivas
*Assistant Examiner* — Robert S Brock
(74) *Attorney, Agent, or Firm* — Squire Patton Boggs (US) LLP

(57) ABSTRACT

In one aspect, a computer-assisted method for the optimization of the design of physical bodies, such as land, air and sea vehicles and robots and/or parts thereof, is provided comprising the steps of: representing the design to be optimized as a mesh, generating update signals to optimize the mesh representation, applying an optimization algorithm until a stop criterion has been reached, and outputting a signal representing the optimized design.

21 Claims, 3 Drawing Sheets

(56) References Cited

U.S. PATENT DOCUMENTS

| | | | | |
|---|---|---|---|---|
| 2005/0143962 | A1* | 6/2005 | Keane | G06F 17/50 703/1 |
| 2006/0187219 | A1* | 8/2006 | Olhofer | G06T 17/30 345/418 |
| 2007/0075450 | A1* | 4/2007 | Belegundu | G06F 17/5018 264/40.1 |
| 2007/0226661 | A1* | 9/2007 | Olhofer | G06T 17/30 703/1 |
| 2008/0183436 | A1* | 7/2008 | Chen | G06F 17/5018 703/1 |
| 2009/0037153 | A1* | 2/2009 | Grichnik | G06F 17/5009 703/2 |
| 2009/0248368 | A1* | 10/2009 | Goel | G06F 17/50 703/1 |
| 2011/0218778 | A1* | 9/2011 | Klimmek | G06F 17/5009 703/2 |
| 2011/0270587 | A1* | 11/2011 | Yamada | G06F 17/5018 703/1 |
| 2013/0185041 | A1* | 7/2013 | Stander | G06F 17/5095 703/6 |
| 2015/0356237 | A1* | 12/2015 | Saito | G06F 17/50 703/8 |
| 2017/0372480 | A1* | 12/2017 | Anand | G06F 17/5009 |

OTHER PUBLICATIONS

An, Wei-Gang, Wei-Ji Li, and Zhong-Qiu Gou. "Multi-objective optimization design of wing structure with the model management framework." Chinese Journal of Aeronautics 19, No. 1 (2006): pp. 31-35.*

Aulig, Nikola, and Markus Olhofer. "Evolutionary generation of neural network update signals for the topology optimization of structures." In Proceedings of the 15th annual conference companion on Genetic and evolutionary computation, pp. 213-214. ACM, 2013.*

Aulig, Nikola, and Markus Olhofer. "Topology Optimization by Predicting Sensitivities based on Local State Features." E. Onate, J. Oliver and A. Huerta (Eds). 11th World Congress on Computational Mechanics, 12 pages. 2014.*

Aulig, Nikola, and Markus Olhofer. "Neuro-evolutionary topology optimization of structures by utilizing local state features." In Proceedings of the 2014 Annual Conference on Genetic and Evolutionary Computation, pp. 967-974. ACM, 2014.*

Aulig, Nikola, and Markus Olhofer. "Neuro-evolutionary Topology Optimization with Adaptive Improvement Threshold." In European Conference on the Applications of Evolutionary Computation, pp. 655-666. Springer International Publishing, 2015.*

S. Defoort, M. Balesdent, P. Klotz, P. Schmollgruber, J. Morio, et al. Multidisciplinary Aerospace System Design: Principles, Issues and Onera Experience. AerospaceLab, 2012, pp. 1-15.*

Gorissen, Dirk. Grid-enabled adaptive surrogate modeling for computer aided engineering. Ghent University, 2010, Chapter 2, pp. 2-1 to 2-18.*

Jin, Yaochu, Markus Olhofer, and Bernhard Sendhoff. "Managing approximate models in evolutionary aerodynamic design optimization." In Evolutionary Computation, 2001. Proceedings of the 2001 Congress on, vol. 1, pp. 592-599. IEEE, 2001.*

Shao, Xinyu, Zhimin Chen, Mingang Fu, and Liang Gao. "Multi-objective Topology Optimization of Structures Using NN-OC Algorithms." In International Symposium on Neural Networks, pp. 204-212. Springer Berlin Heidelberg, 2007.*

Wu, Chun-Yin, Ching-Bin Zhang, and Chi-Jer Wang. "Topology optimization of structures using ant colony optimization." In Proceedings of the first ACM/SIGEVO Summit on Genetic and Evolutionary Computation, pp. 601-608. ACM, 2009.*

Chang, K-H., and P-S. Tang. "Integration of design and manufacturing for structural shape optimization." Advances in engineering software 32, No. 7 (2001): 555-567.*

Chen, Ting-Yu, and Chia-Yang Lin. "Determination of optimum design spaces for topology optimization." Finite Elements in Analysis and Design 36, No. 1 (2000): 1-16 (Year: 2000).*

Papadrakakis, Manolis, and Nikos D. Lagaros. "Reliability-based structural optimization using neural networks and Monte Carlo simulation." Computer methods in applied mechanics and engineering 191, No. 32 (2002): 3491-3507 (Year: 2002).*

Papadrakakis, Manolis, Nikos D. Lagaros, and Yiannis Tsompanakis. "Structural optimization using evolution strategies and neural networks." Computer methods in applied mechanics and engineering 156, No. 1-4 (1998): 309-333 (Year: 1998).*

European Search Report dated Jun. 25, 2013 corresponding to European Patent Application No. 13153179.0, 7 pages.

Amir-R. Khorsand et al., "Multi-Objective Meta Level Soft Computing-Based Evolutionary Structural Design," Journal of the Franklin Institute, vol. 344, No. 5, May 19, 2007, pp. 595-612, XP022086172.

R. Balamurugan et al., "Performance Evaluation of a Two Stage Adaptive Genetic Algorithm (TSAGA) in Structural Topology Optimization," Applied Soft Computing, vol. 8, No. 4, Sep. 1, 2008, pp. 1607-1624, XP024520250.

J. Denies et al., "Genetic Algorithme-based Topology Optimization: Performance Improvement Through Dynamic Evolution of the Population Size," Power Electronics, Electrical Drives, Automation and Motion (SPEEDAM), 2012 International Symposium, Jun. 20, 2012, pp. 1033-1038, XP032221791.

Erik Andreassen et al., "Efficient Topology Optimization in MATLAB Using 88 Lines of Code," published in Structural and Multidisciplinary Optimization, vol. 43, Issue 1, 2011, 15 pages.

M. P. Bendsoe, "Optimal Shape Design as a Material Distribution Problem," Structural Optimization, vol. 1, 1989, pp. 193-202.

M. P. Bendsoe, "Generating Optimal Topologies in Structural Design Using a Homogenization Method," Computer Methods in Applied Mechanics and Engineering, vol. 71, Issue 2, 1988, pp. 197-224.

N. M. Patel, "Crashworthiness Design Using Topology Optimization," PhD Thesis, University of Notre Dame, Jul. 2007, 200 pages.

X. Huang et al., "Convergent and Mesh-independent Solutions for the Bi-Directional Evolutionary Structural Optimization Method," Finite Elements in Analysis and Design, vol. 43, ElSevier, 2007, pp. 1039-1049.

* cited by examiner

OPTIMIZING THE DESIGN OF PHYSICAL STRUCTURES/OBJECTS

The invention belongs to the field of topology optimization of physical objects and in particular to a method and system for optimizing the design of land, air and sea vehicles and/or robots or parts thereof in respect to physical properties of the object such as e.g. thermodynamic, aerodynamic (such as e.g. drag) or hydrodynamic parameters as well as weight and/or mechanical characteristics. In one aspect, the invention relates to the optimization of vehicle and/or robot bodies.

At the end of the topology optimization method a software representation of an optimized body is achieved, which can be output as a signal and which software representation may be translated automatically into a real-world ("physical") object using computer assisted manufacturing. The optimized physical object ("body") distinguishes from a non-optimized by means of at least one measurable physical parameter.

In detail, the invention relates to the design of a physical structure obtained essentially by optimizing the topology respectively the layout. It can especially be applied in all technical fields in which the optimization of the overall design/structure can be achieved by the adaptation of the design variables based on information about sub-parts of the structure. This is the case for conventional topology optimization methods which can be applied e.g. for the design of minimum compliance structures, for the design of structures with minimal vibrations, for the design of compliant mechanisms and more.

The invention exceeds the application range of existing topology optimization methods as it is as well applicable to the optimization of arbitrary quality functions including above mentioned problems but also aerodynamic and thermodynamic quality functions, quality functions concerning crashworthiness and combinations of those. It can be applied to problems in which the quality measure is different in distinct areas of the design space which is for example the case for the crashworthiness optimization of cars in which maximal energy absorption is required in case of an impact in some parts of the structure and minimal compliance in other areas like around the passenger seats.

In recent years the application of computer-aided engineering methods in industry is increasing due to associated potential cost savings.

One way of reducing for example production cost to replace real-world experiments, i.e. experiments where dummy products, e.g. prototypes, are produced according to preliminary plans, tested, and where the preliminary plans are changed to produce another version of the (dummy) product with simulations executed on computer hardware. These simulations can be used for extensive product optimization, but physical parameters of the product can be changed and the possible effects can be determined from simulation results.

In this context topology optimization is applied for the optimization of the physical object/design, in general of mechanical structures. Topology is an area concerned with basic properties of space, such as connectedness. More precisely, topology studies properties of objects that are preserved under continuous deformations, including stretching and bending, but not tearing or gluing.

Ideas that are now classified as topological were expressed as early as 1736. Toward the end of the 19th century, a distinct discipline developed, which was referred to in Latin as the geometria situs ("geometry of place") or analysis situs (Greek-Latin for "picking apart of place"). This later acquired the modern name of topology. By the middle of the 20th century, topology had become an important area of study.

Topology optimization hence is an approach that, e.g., optimizes the material layout of a physical object within a given design space subject to a quality function, and constraints relating to the physical properties of the object.

Typical quality functions are for example compliance minimization or Eigenvalue maximization.

For the design space boundary conditions are specified for example loads and supports, applicable for the structure, which is to be designed. Loads can for example be mechanical forces or impacting bodies.

Existing topology optimization has been implemented through the use of finite element methods for the structural analysis, and optimization techniques like the method of moving asymptotes, genetic algorithms, optimality criteria method, level sets and topological derivatives.

It results in a conceptual design for the given design space. The advantage of topology optimization is that a concept structure is provided in an automatic process without any pre-knowledge on the initial design.

In contrast to shape- or general parameter-based optimizations, topology optimization is able to provide a concept for the underlying geometry respectively layout of the structure. An example for efficient state of the art topology optimization can be found in the document by E. Andreassen, A. Clausen, M. Schevenels, B. S. Lazarov, O. Sigmund, titled "Efficient topology optimization in MATLAB using 88 lines of code" (published in Structural and Multidisciplinary Optimization, Volume 43, Issue 1, Pages 1-16, 2011).

Topology optimization is in particular used at the concept or prototyping level of the design process to arrive at a conceptual design proposal that is then fine tuned for performance and manufacturability.

The latter is important as proposals from a topology optimization, although optimized according to the design requirements, may be expensive or infeasible to manufacture. This can be overcome through the use of manufacturing constraints in the topology optimization problem formulation. Using manufacturing constraints, the topology optimization yields engineering designs that would satisfy practical manufacturing requirements. In some cases additive manufacturing technologies are used to manufacture complex optimized shapes that would otherwise need manufacturing constraints.

One type of topology optimization uses a discretized version of the design space which usually is equal to the computational grid used for the finite element analysis (FEA) of the structure.

The word "design" can mean any kind of decision making regarding the shape or composition of a physical structure or object. The design is represented by parameters referred to as design variables. Optimizing a design of structures/objects, which is the primary target of this invention, involves making decisions not only about the shape of the structure/object or thickness of certain parts of the structure/object, but also about the overall layout of the structure/object.

For example it could be decided how many wings a rotor should have or where beams in a framework are located, without necessarily deciding already their thickness, or in general how sub-parts of the structure are connected. This kind of design optimization is addressed by an optimization of the structure/object topology. The design variables involved in this case can be discrete but also continuous.

Structural topology optimization is achieved by finding the optimum distribution of material within this design space.

Every cell of a finite element mesh, which can be used for the structural analysis, can be a design variable which can be assigned the attribute "material" or "no material", which denotes whether a cell is filled with material or not.

A design variable can hence e.g. be a binary value or a threshold value can be calculated or be predetermined, to define whether a design variable value represents "material" or "no material". For example, it could be determined that the design variable defines "no material" if the design variable value is below the threshold value, and "material" when the design variable value reaches or is above the threshold value, or vice versa. Of course, there can be more than one threshold value, even a threshold value for each design variable.

Usually a discrete zero-one problem, i.e. making a decision with only two possible outcomes, is transformed into another representation by introducing at least one continuous design variable per finite element. This approach is known as the homogenization method or the Solid-isotropic material with penalization model (SIMP) as further explained in the document by M. P. Bendsøe, titled "Optimal shape design as a material distribution problem" (published in "Structural Optimization", Volume 1, Pages 193-202) and the document by M. P. Bendsøe, N. Kikuchi, titled "Generating optimal topologies in structural design using a homogenization method" (published in "Computer Methods in Applied Mechanics and Engineering", Volume 71, Issue 2, Pages 197-224, 1988).

FIG. 1 shows an example for a topology optimization setup, exemplarily and schematically showing a finite element mesh, where each cell is a design variable, which can, e.g., be either zero or one. Boundary conditions like supports and loads are defined. In the context of FIG. 1 loads are indicated by arrows and could for example represent static loads that deform the structure. The supports in FIG. 1 are indicated by the bar on the left side and could for example indicate that (mesh) nodes attached to that bar cannot be displaced.

In an initial design material is distributed uniformly within the design space. Based on the topology optimization setup, material is redistributed iteratively using either a heuristic optimality criterion update or mathematical programming methods. Usually a volume constraint is imposed to specify a desired structural mass. The existing topology optimization methods rely on a sensitivity analysis of the design variables and require a precise mathematical formulation of the problem. The use of the adjoint sensitivities facilitates to modify each design variable individually to improve the quality function. In this way a solution of the problem can be generated in a very efficient way.

This method has been applied to a multitude of problems like compliance, vibrations, Eigenvalues, compliant mechanisms and many more. It has become the standard for topology optimization and forms the basis for implementations in commercial software.

Other methods exist which instead of a sensitivity analysis use heuristic criteria, for the material redistribution, which can also be very efficient for the problem for which the heuristics are designed. Several heuristic-based examples can be found. The Hybrid Cellular Automata algorithm, as outlined in the document by N. M. Patel titled "Crashworthiness Design using Topology Optimization" (PhD thesis, University of Notre Dame, 2007), describes and optimizes structures subject to crash loads, based on the absorbed energy in each element. The "Bi-directional Evolutionary Structural Optimization" as outlined in the document "Convergent and mesh-independent solutions for the bi-directional evolutionary structural optimization method" (published in Finite Elements in Analysis and Design, Volume 43, Pages 1039-1049, 2007) solves discrete topology optimization problems based on a "sensitivity number".

As the design variables refer to finite elements in the computational model of a structure they can be considered to be located at a position in the design space as well as having a special relation (e.g. distance) to other design variables. In the following the term "local information" refers to properties of finite elements within a certain defined distance (i.e. neighborhood) of the considered position in the design space depending on the design variable. A local region is a (tentative) small part of the design space. Local information can be enriched with global structural information by making it available also locally, like for example elemental positional information or the structural global mass.

Considering conventional topology optimization approaches the gradient information e.g. analytical sensitivity is computed based on local information of the structural analysis. As illustration example it is referred to the problem of minimizing the compliance of a structure as quality function in topology optimization. In this case the sensitivity can be computed from displacements of nodes of an finite element which corresponds to the design and the design variable itself.

In the example of FIG. 1, when a two-dimensional design space is used, the element is a cell of the design space, i.e. a field of the mesh. In this case the sensitivity depends on local information computed by a physics simulation. FIG. 4 shows an example of local information related to a two-dimensional cell of the design space (cf. FIGS. 1 and 2). In this case the local information consists of the displacements $u_1$ to $u_8$ nodes defining the finite element and the design variable $x_i$, where i is the index of the element, i.e. referring to the elemental position in the design space.

In this invention local information may refer to (but not restricted to) displacements, strain, stress, energy, heat, flow, pressure or similar variables depending on the physics of the problem.

Sensitivity information or heuristic criteria in existing topology optimization methods are used to redistribute material of the structure. For the computation of the sensitivity or the heuristic criteria that are used to adapt the design variables, local information from the structural analysis of the design is used. Those methods can therefore be considered as methods that update the design variables, according local information according to an "update signal".

Essential to the prior art approaches on topology optimization is that the gradient information resulting from a sensitivity analysis or a heuristic criterion has to be derived for every problem formulation individually in order to obtain a useful optimization result. Therefore existing topology optimization methods are gradient-based methods.

This can only be achieved if the physics of the problem is understood and can be handled mathematically or intuitively. However, for problems for which sensitivity information or heuristics are not available there exists no straight forward topology optimization method. These are mainly problems with severe nonlinearities or complex constraints.

In an automatic computational process functional mapping from local information to an update signal is generated, which can be used in a topology optimization for a beforehand specified quality functions and constraints. In the following, a functional mapping from local information to the update signal is referred to as "update strategy". Hereby, the application of topology optimization for the structural optimization for quality functions and constraints is facilitated, for which no sensitivity information or heuristic alternative is available. After generation of the update strategy it may be reused for the topology optimization of other structures which are to be optimized subject to the same or similar quality function and constraints specified before the optimization, but different boundary conditions.

The automatic process generating the update strategy can be a global stochastic optimization algorithm used for optimization problems, which have multiple optima or include random or noisy components. In these cases the applicability of gradient-based optimization methods are limited. Examples for these kinds of global optimization strategies are:

Evolutionary algorithms (e.g., genetic algorithms and evolution strategies, differential evolution), Swarm-based optimization algorithms (e.g., particle swarm optimization, Multi-swarm optimization and ant colony optimization)

The main disadvantage of these methods is their high costs in terms of quality function evaluations compared to local optimization methods. This is why stochastic search algorithms are currently not applied for topology optimization directly, as topology optimization problems can require the optimization of millions of design variables.

The high dimensionality arises from the representation used in topology optimization, as every cell of the discretized design space represents at least one optimization parameter.

It is therefore an aim of the invention to provide a method and a system for the topology optimization of physical objects. The invention provides a solution to optimization problems for which no gradient information is available analytically or heuristically and non-gradient optimization strategies cannot be applied due to high computational costs.

Main aspects of the invention are subject to the independent claims, while further aspects of the invention are outlined in the dependent claims.

In one aspect, a computer-assisted method for the topology optimization of the design of physical bodies, such as land, air and sea vehicles, and robots and/or parts thereof, is provided having the features of claim 1.

The optimization can consist of two phases. Phase one can be a dual process comprising a first (or outer) optimization process, e.g. a machine learning or stochastic optimization, generating update strategies to a second (or inner) optimization process. The second process can be a topology optimization which is initialized by the outer process and uses the update strategies provided by the first process for the material redistribution.

The first optimization process may start with an initial update strategy or a set of initial update strategies.

The initial update strategy or strategies can be supplied to and used in the second optimization process for the iterative redistribution of material.

The second optimization process can be started on an initial physical object and/or an initial design of a physical object. It can be started multiple times referring to the number of update strategies provided by the first process. A topology optimization can be started on a physical object and/or design of a physical object utilizing the update strategy generated by the dual optimization process.

The second optimization process can be started on a physical object and/or design of a physical object obtained from a preceding run of the second optimization process. The second optimization process can be started again on an initial physical object and/or an initial design of a physical object or it may reuse the physical object and/or design or design of the physical object obtained from as last run of the second optimization.

A structural analysis may be performed using e.g. a finite element analysis on an optimized physical object.

The second optimization process can stop when a stop criterion is met.

The quality according to a quality function or physical properties needed to evaluate a quality value of the optimized physical object resulting from the second optimization process may be returned to the first optimization process.

Based on a quality function and/or predetermined constraints a performance of the optimized physical object can be evaluated.

If the optimized physical object satisfies a convergence criterion, e.g. when an optimization objective is met, the second optimization process can be stopped.

The results of the evaluation of the optimized physical object may be used as feedback to evaluate the quality of the set of update strategies.

An improved set of update strategies can be generated or the previous set of update strategies may be adapted using a further optimization and/or a learning scheme. The second optimization process may be started again with the adapted update strategies.

After phase one of the optimization is finished the resulting update strategies can be applied for the topology optimization of structures subject to the same or a similar optimization objective and constraints, but with different boundary conditions on the design space.

The physical object can be optimized in view of at least one of thermodynamic, aerodynamic (such as e.g. drag) or hydrodynamic parameters as well as weight and mechanical characteristics.

The physical object can be a land, air and/or sea vehicle and/or a robot or a part and/or design thereof.

In another aspect, a computer-assisted method for the optimization of the mesh representation for use in a method for the design of physical bodies, such as land, air and sea vehicles and robots and/or parts thereof, is provided comprising the steps of: representing the design to be optimized as a mesh, optimizing the mesh representation, applying an optimization algorithm until a stop criterion has been reached, and outputting a signal representing the optimized design.

In yet another aspect, a system for the optimization of the design of physical bodies, such as land, air and sea vehicles and robots and/or parts thereof, is provided comprising: means for obtaining design parameters of a physical object, means for representing the design parameters in a design space, means for performing a topology optimization of a physical object until a stop criterion is met, means for iteratively redistributing material, and means for outputting a signal representing the optimized design, the system being designed to perform the method outlined above.

The invention is also described with reference to the figures.

Figure 1:
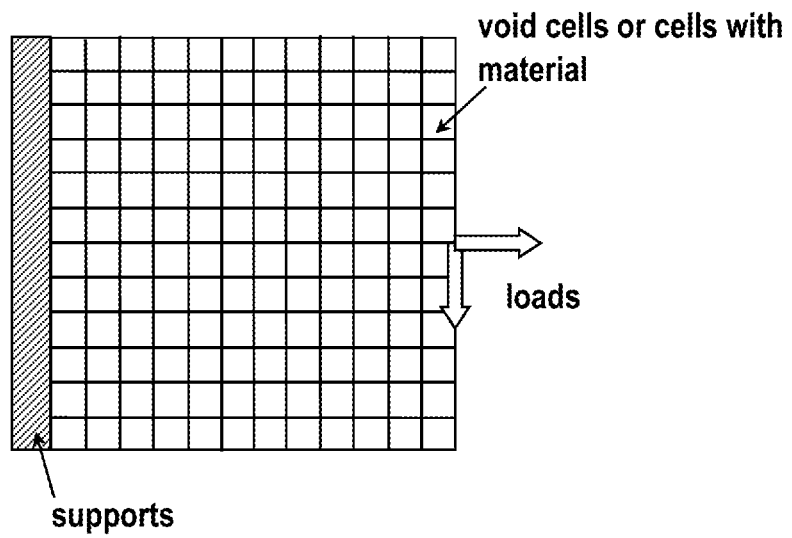
FIG. 1 shows an example for a topology optimization setup.
Figure 2:
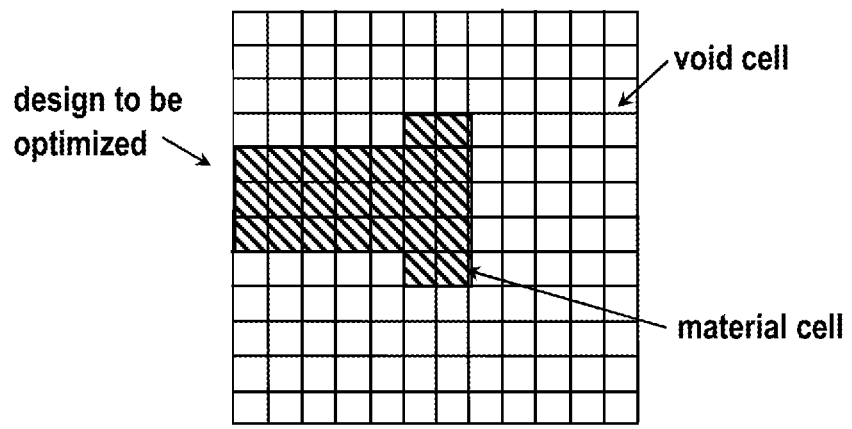
FIG. 2 shows a schematic view of a two dimensional design space discretization.

FIG. 2 shows a schematic and exemplary description of an (virtual) object embedded in a two dimensional mesh (as shown in FIG. 1). The virtual object is a representation of a real object. Each cell of the virtual object is described by at least one design variable describing whether and to which degree such cell contains (virtual) material for forming a design or whether it is a void cell containing no material. Of course, while exemplarily a 2D design space is shown to illustrate the inventive method, it is of course to be understood that higher dimensional design spaces (also higher than 3) can be used. This also holds for FIGS. 1 and 4.

Structures, physical objects/designs are optimized with respect to quality functions by using a process which generates update strategies replacing gradient information. Those update strategies can be applied in the same way as conventional gradient information for the iterative redistribution of material within the structure by accordingly changing the design variables.

Figure 3:
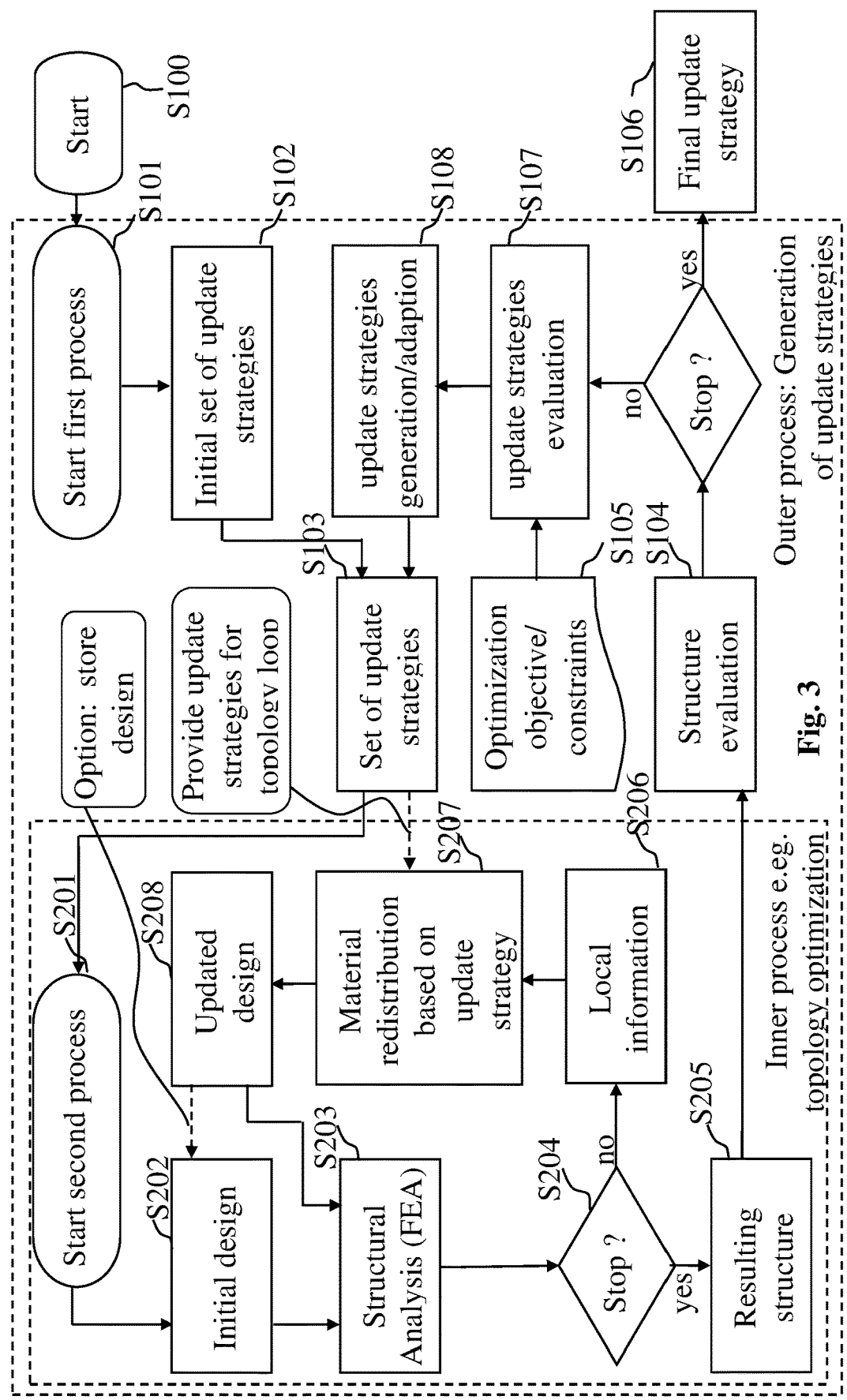
FIG. 3 shows a flowchart of a process according to the invention.

Overall phase one of the optimization is a dual process and is illustrated in FIG. 3.

The overall dual process starts with step S100. First, the outer process starts in step S101 with an initial set of update strategies (S102), or a set of update strategies which can be chosen randomly. These update strategies are then supplied to and used in the inner topology optimization process for the iterative redistribution of material, as illustrated in step S103.

Generally, it should be understood that FIG. 3 might show a more detailed process for the sake of explanation and that not all steps need to be executed by the process when implemented. For example, the set of update strategies passed to the inner process does not necessarily be separated from the initial set of update strategies of step S102. Also, as described below, also the initial update strategies can be updated later.

The inner process is started in step S201 by starting a topology optimization on an initial design, e.g. an initial design of a product (S202). In particular, a structural analysis is performed using in particular a finite element analysis is performed in step S203.

The inner process stops (S204) when a stop criterion is met, for example when a maximum number of iterations is reached or the amount of redistributed material is less than a specified threshold.

If the convergence criterion is not fulfilled, required local information is extracted from the structural analysis. This information is used to redistribute material according to the update strategy provided by the outer process and yields a modified structure (S207). The inner loop is continued with a structural analysis of this modified structure resulting from the updated design (S208). Optionally the most recent updated structure can be stored as initial structure for the next start of the inner loop.

The resulting structure of the topology optimization is then returned to the outer process (S205). Based on the quality function and the constraints the performance of the structure is evaluated (S104). If the structure satisfies the convergence criterion, e.g. when the optimization objective(s)/constraint(s) (S105) is/are met, the outer process is stopped as well (S106).

Otherwise the results of the structure evaluation are used as feedback to evaluate (S107) the quality of the set of update strategies provided in steps S102/S103. In this way it is possible to evaluate the quality of the current update strategies set using the improvement of the design during the inner loop optimization.

An improved set of update strategies is then generated or the previous update strategies set is adapted (S108) using an optimization or a learning scheme.

After the phase one process has ended the final resulting update strategy can be utilized in phase two. In phase two the topology optimization of structures can be optimized by using the generated update strategy for the same or similar objective functions and constraints as has been used in the optimization of the update strategy in the first phase, but with different boundary conditions of the design space.

Figure 4:
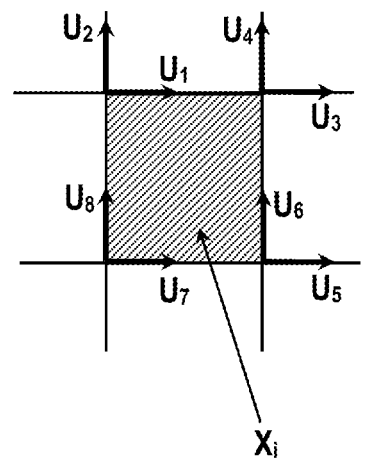
FIG. 4 shows an example of local information.

FIG. 4 shows an example of local information related to a two-dimensional cell of the design space (cf. FIGS. 1 and 2). The local information in this example are the displacements $u_1$ to $u_8$ of elemental nodes and the design variable $x_i$, where i is the index of the element, e.g. the field of the mesh.

The adapted update strategies (S102) are generated as a functional relation of the local information e.g. results of the physics simulation of the structure. The results of the structural analysis which are considered relevant for the update strategy and which can be locally distinguished for every finite element of the design space can be referred to as local information. Other local information can be spacial position or external data that is made available for each element separately.

Figure 5:
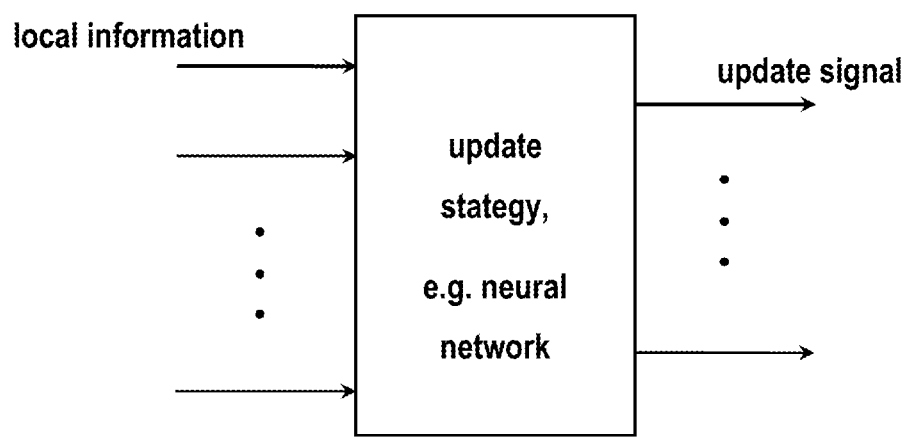
FIG. 5 illustrates a set of possible local information for the computation of compliance sensitivity for a two-dimensional element.

FIG. 5 shows a schematic description of the update strategy with in- and outputs. Since all inputs refer only to a local part of the design they can be considered as local information.

The functional relation by which an update strategy is represented, based on such local information and can be expressed by a model, e.g. by an artificial neural network. Here, the outer process applies an optimization or learning method to improve the weights of the neural network depending on the feedback from the inner loop.

Assuming the local information given to the neural network model include thermodynamic properties, designs can be optimized for example concerning the ability to transfer heat. Given local information on the position it is possible that the update strategy takes the position within the overall physical structure into account. This may be of interest for example in the automobile application in which areas for crash energy absorption can be defined, in which high deformation are required for maximum energy absorption. At the same time areas near the passenger require a maximum of stiffness to protect the passenger. This local variation in design quality can be realized by adding the required local information as input to the update strategy.

In order perform the calculations required in the optimization process/the dual process, the invention may use and include processing means and/or apply neural networks to represent the update strategies. Neural networks models allow working with none or only little a priori knowledge on a problem to be solved and also show a failure tolerant behavior. A neural network thereby consists of a set of neurons and a set of synapses. The synapses connect neurons and store information in parameters called weights, which are used in transformations performed by the neural network and learning processes.

Typically, an input defining a start for the optimization is accepted by the system (S100, S101). The processing means may consist of hardware units and/or software components. An output is generated, which may serve as input to other systems for further processing, as a result from the optimization.

The input may be supplied by one or more sensors, e.g. visual sensing means, e.g. sensing features of a prototype object but also by a software or hardware interface. The output may as well be output through a software and/or hardware interface or may be transferred to another processing module or actor, e.g. production equipment such as an 3D-Printer, to produce an object according to the output. Further, the result of the dual optimization process can be supplied digitally or analogous to an automated production line producing the optimized physical object.

Computations, calculations and transformations required by the invention, necessary for evaluation, processing, maintenance, adjustment, and also execution of the optimization may be performed by the processing means using one or more processors (CPUs), signal processing units or other calculation, processing or computational hardware and/or software, which might also be adapted for parallel processing. Processing and computations may be performed on standard off the shelf (OTS) hardware or specially designed hardware components. A CPU of a processor may perform the calculations and may include a main memory (RAM, ROM), a control unit, and an arithmetic logic unit (ALU). It may also address a specialized graphic processor, which may provide dedicated memory and processing capabilities for handling the computations needed.

Also data memory is usually provided. The data memory is used for storing information and/or data obtained, needed for processing, determination and results. The stored information may be used by other processing means, units or modules required by the invention. The memory also allows storing or memorizing observations related to events and knowledge deducted therefrom to influence actions and reactions for future events.

The memory may be provided by devices such as a hard disk (SSD, HDD), RAM and/or ROM, which may be supplemented by other (portable) memory media such as floppy disks, CD-ROMs, Tapes, USB drives, Smartcards, Pendrives etc. Hence, a program encoding a method according to the invention as well as data acquired, processed, learned or needed in/for the application of the inventive system and/or method may be stored in a respective memory medium.

In particular, the method described by the invention may be provided as a software program product on a (e.g., portable) physical memory medium which may be used to transfer the program product to a processing system or a computing device in order to instruct the system or device to perform a method according to this invention. Furthermore, the method may be directly implemented on a computing device or may be provided in combination with the computing device.

It should be understood that the foregoing relates not only to embodiments of the invention and that numerous changes and modifications made therein may be made without departing from the scope of the invention as set forth in the following claims.

Nomenclature:

Topology optimization—Refers to the process of automatically providing a concept structure for the design of mechanical structures.

Update strategy—A functional relation used to compute sensitivity replacing update signals for material redistribution in topology optimization based on available local information.

Gradient information—A direction in the search space for which the quality of the design improves.

The invention claimed is:

1. A computer-assisted method for the optimization of the topology of a physical object resulting in an optimized distribution of material with respect to at least one of an aerodynamic, thermodynamic, crashworthiness, and mechanical compliance quality function and constraints relating to the physical properties of the physical object, wherein the physical object is at least one of a land vehicle, an air vehicle, a sea vehicle, a robot, or at least one of a part or design thereof, the method comprising the steps of:

obtaining design parameters of the physical object or a design of the physical object;

representing the design parameters in a design space;

performing a topology optimization of the design parameters until a stop criterion is met, wherein the topology optimization comprises an iterative local redistribution of material of the physical object, wherein the iterative local redistribution of material is performed using update strategies for the local redistribution of the local material based on local information at a location of the redistribution of a structure of the physical object, wherein the update strategies define a functional mapping from the local information to an update signal, and the local information refers to properties of finite elements within a predetermined distance of the location in the design space depending on the design variable, and wherein in response to the structure of the physical object at a time when the stop criterion is met not meeting a convergence criterion, updating the update strategies at the location of the local redistribution based on the local information including at least one of thermodynamic properties, energy absorption and position in an overall physical structure as an input for each finite element of the topology optimization separately, wherein the updating is performed without using gradient based sensitivity information, and repeating the performing of the topology optimization of the design parameters on the basis of the updated update strategies of another location of the local redistribution location; and outputting a signal representing the optimized design parameters to a processor when the convergence criterion is met, wherein the processor is used to manufacture the physical object including the optimized distribution of materials based on the optimized design parameters.

2. The method of claim 1, wherein the further optimization comprises a dual process comprising a first optimization process, wherein the first optimization process comprises at least one of machine learning or stochastic optimization, and providing update strategies to a second optimization process, wherein the second optimization process comprises a topology optimization, which is initialized by the first optimization process.

3. The method of claim 2, wherein the first optimization process starts with an initial update strategy, an initial set of the update strategies, or a set of the update strategies which can be chosen randomly.

4. The method of claim 3, wherein the initial update strategies are supplied to and used in the second optimization process for the iterative redistribution of material.

5. The method of claim 2, wherein the second optimization process is started on at least one of an initial physical object or an initial design of a physical object.

6. The method of claim 2,
wherein the topology optimization is started on at least one of the physical object or a design of the physical object utilizing the update strategies generated by the first optimization process.

7. The method of claim 2,
wherein the second optimization process is started on at least one of the physical object or a design of the physical object obtained from a preceding run of the second optimization process.

8. The method of claim 1, further comprising:
performing a structural analysis using at least a finite element analysis on the optimized physical object.

9. The method of claim 2,
wherein the second optimization process stops when the stop criterion is met.

10. The method of claim 2,
wherein a quality determined according to at least one of a quality function or physical properties that are needed to evaluate a value of the quality of a resulting optimized physical object resulting from the second optimization process is returned to the first optimization process.

11. The method of claim 2,
wherein a performance of the evaluated physical object is evaluated based on at least one of a quality function or predetermined constraints.

12. The method of claim 2,
wherein if the optimized physical object satisfies boundary conditions, wherein the boundary conditions comprise an optimization objective, the second optimization process is stopped.

13. The method of claim 2,
wherein the results of an evaluation of the optimized physical object are used as feedback to evaluate a quality of a set of the update strategies provided to evaluate a quality of a current update strategies using improvement of the design during the second optimization process.

14. The method of claim 2,
wherein an improved set of update strategies is generated or a previous set of the update strategies is updated using at least one of the further optimization or a learning scheme.

15. The method of claim 1,
wherein the update strategies are generated by an automatic process that is utilized for adaptation of the design parameters representing physical properties of a structure of the physical object.

16. The method of claim 1,
wherein the update strategies are generated by an optimization or learning procedure that is utilized for adaptation of the design parameters representing physical properties of the structure.

17. The method of claim 1,
wherein the design parameters represent an amount of material within the structure.

18. The method of claim 1,
wherein final resulting update strategies are utilized for same or similar objective functions and constraints as has been used in the further optimization of the update strategies, in particular with different boundary conditions of the design space.

19. The method of claim 1,
wherein a desired mass of the physical object and/or a mass computed from the design of a physical object is fixed or not fixed initially.

20. The method of claim 1,
wherein the physical object is optimized in view of at least one of thermodynamic, aerodynamic, or hydrodynamic parameters and at least one of weight characteristic or mechanical characteristic.

21. A apparatus for optimization of a design of physical object resulting in an optimized distribution of material optimized with respect to at least one of an aerodynamic, thermodynamic, crashworthiness, and mechanical compliance quality function and constraints relating to the physical properties of the physical object, wherein the physical object is at least one of a land vehicle, an air vehicle, a sea vehicle, a robot, or at least one of a part or design thereof, the apparatus comprising a processor, wherein the processor is configured to at least:
obtain design parameters of the physical object or a design of the physical object,
represent the design parameters in a design space,
perform a topology optimization of the design parameters until a stop criterion is met, wherein the topology optimization comprises an iterative local redistribution of material of the physical object,
wherein the iteratively redistributing material of the physical object is performed using update strategies for the local redistribution of the local material based on local information at a location of the redistribution of a structure of the physical object,
wherein the update strategies define a functional mapping from the local information to an update signal, and the local information refers to properties of finite elements within a predetermined distance of the location in the design space depending on the design variable, and
if the structure of the physical object at a time when the stop criterion is met does not meet a convergence criterion, updating the update strategies at a location of the local redistribution based on the local information including at least one of thermodynamic properties, energy absorption and position in an overall physical structure as an input for each finite element of the topology optimization separately, wherein the updating is performed without using gradient based sensitivity information, and repeating the performing of the topology optimization of the design parameters on the basis of the updated update strategies, and
output a signal representing the optimized design parameters to the processor when the convergence criterion is met, wherein the processor is used to manufacture the physical object including the optimized distribution of materials based on the optimized design parameters.

* * * * *